United States Patent [19]

Speicher

[11] 4,238,802
[45] Dec. 9, 1980

[54] DIFFERENTIAL DRIVE ROLLING ARC GIMBAL

[75] Inventor: John M. Speicher, Pomona, Calif.

[73] Assignee: General Dynamics Corporation, Pomona Division, Pomona, Calif.

[21] Appl. No.: 970,284

[22] Filed: Dec. 18, 1978

[51] Int. Cl.³ .............................................. H01Q 3/08
[52] U.S. Cl. .................................. 343/765; 343/766; 74/1 R
[58] Field of Search .............. 343/763, 764, 765, 766; 74/1 R, 501 R, 501 M

[56] References Cited

U.S. PATENT DOCUMENTS

| 2,512,636 | 6/1950 | Flynt | 343/765 |
| 3,439,550 | 4/1969 | Coulding | 343/765 |

Primary Examiner—Eli Lieberman
Attorney, Agent, or Firm—Neil F. Martin; Edward B. Johnson

[57] ABSTRACT

A gimbal assembly in which the outer gimbal member is an arcuate yoke mounted on rollers to rotate about one axis, and the inner gimbal member is a platform pivotally mounted in the yoke to rotate about a second orthogonal axis. Two motors are connected through a differential drive system to rotate either gimbal member selectively or both together in any combination of motions. In one form the differential drive is an endless cable extending around the outer gimbal member and around pulleys on the axis of the inner gimbal member. In a modified form the cable is crossed at one end to drive the inner gimbal member from both ends. In another form the differential drive includes split outer ring members driven individually by the two motors and coupled to the inner gimbal member by a rack and pinion drive.

3 Claims, 7 Drawing Figures

DIFFERENTIAL DRIVE ROLLING ARC GIMBAL

BACKGROUND OF THE INVENTION

Gimbal mountings for antennas, optical devices and the like have been made in many different configurations. One particular type has an outer gimbal in the form of a yoke which rotates in an arcuate support about one axis, and carries an inner gimbal which rotates in the yoke about another axis. In one arrangement the outer gimbal is driven by one motor and the inner gimbal is driven by a separate motor mounted on the inner gimbal. This adds considerable weight to the moving components and, in most instances, requires balancing means for smooth operation.

In another arrangement, such as shown in U.S. Pat. No. 2,654,031, two motors are connected to a differential drive mechanism to drive both gimbals, either selectively or in various combinations of motions. This mechanism is a complex arrangement using a cable to drive the outer gimbal, with a connection to the inner gimbal through a differential gear mechanism at one end and a reversing gear at the other end. This also results in considerable unnecessary weight being carried on the moving components.

SUMMARY OF THE INVENTION

The gimbal mechanism described herein incorporates a simple drive arrangement which minimizes the mass of the moving components, so reducing inertia and also power requirements to drive the mechanism.

The outer gimbal member is an arcuate yoke which is mounted on rollers in a fixed support to rotate about one gimbal axis. The inner gimbal member is a platform which is pivotally mounted in the yoke to rotate about a second gimbal axis orthogonal to the first. The platform can carry a variety of devices such as an antenna, an optical transmitting or detecting device, or the like, which need to be pointed in a particular direction or scanned over a selected area in a particular pattern. Two motors are mounted coaxially on opposite sides of the fixed support, axially parallel to the rotational axis of the outer gimbal member. Each motor is coupled to drive the outer gimbal member in either direction and also coupled to drive the inner gimbal member in either direction. In the basic configuration each motor carries a pulley which drives a cable. The cable is an endless element and passes over one drive pulley, over support rollers on one side of the yoke, around a pulley on the axial support of the inner gimbal member, over support pulleys on the other side of the yoke, over an idler pulley at the other end of the inner gimbal support and back over the drive pulley of the other motor. As used herein, the term endless element includes drive elements with joint couplings and the like. Both motors turning equally in the same direction will rotate only the yoke, while both motors turning equally in opposite directions will rotate only the inner gimbal member. Differential operation of the motors will provide compound motions of the gimbal members about both axes in any desired pattern.

In a modified form of the cable drive, the idler pulley is replaced by a second pulley secured to the shaft of the inner gimbal member. The cable is then crossed over at one end so both inner gimbal pulleys are driven in the same direction for a more rigid drive action.

In another form of the mechanism the motors drive split ring members sliding in the arcuate yoke, the ring members have toothed racks at one end which engage a pinion on the shaft of the inner gimbal member. The ring members can be coupled to the motors by friction or gear drive means.

The primary object of this invention, therefore, is to provide a new and improved differential drive rolling arc gimbal.

Another object of this invention is to provide a gimbal mechanism in which any desired compound motion of the gimbal can be obtained by combinations of similar and differential actions of two motors.

Another object of this invention is to provide a gimbal mechanism in which the drive motors are mounted on the fixed supporting structure and the mass of the moving components is minimized.

A further object of this invention is to provide a gimbal mechanism which is adaptable to cable or gear drive means, to suit specific applications.

Other objects and advantages will be apparent in the following detailed description, taken in conjunction with the accompanying drawings in which.

DESCRIPTION OF THE PREFERRED EMBODIMENT

Figure 1:
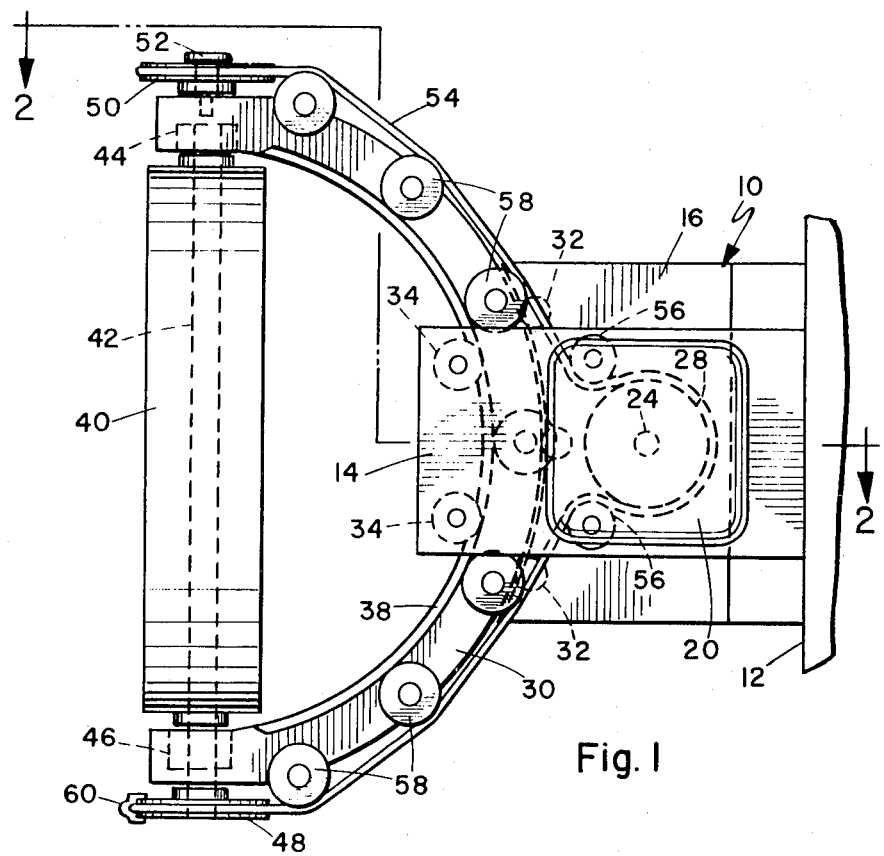
FIG. 1 is a side elevation view of one form of the gimbal mechanism.
Figure 2:
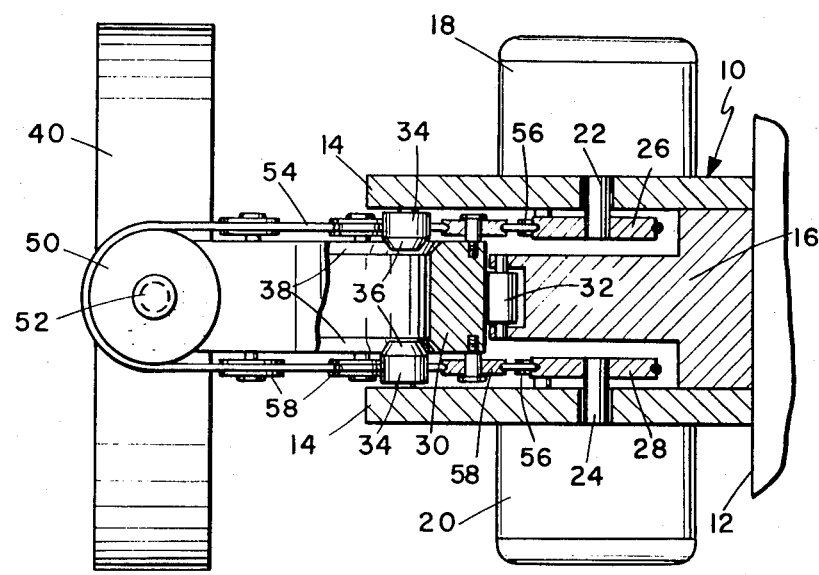
FIG. 2 is a sectional view taken on line 2—2 of FIG. 1.

The gimbal mechanism illustrated in FIGS. 1 and 2 has a mounting 10 which is attached to a suitable support 12, such as a portion of structure of a vehicle or installation in which the gimbal is used. Mounting 10 comprises a pair of side plates 14 on opposite sides of a support block 16. Drive motors 18 and 20 are secured on side plates 14 with their respective drive shafts 22 and 24 in opposed coaxial alignment. Drive pulleys 26 and 28 are fixed on shafts 22 and 24 inside the side plates 14.

The outer gimbal member is an arcuately shaped yoke 30 which seats against support rollers 32 inset in support block 16, the block being shaped to fit the curve of the yoke. The yoke is substantially semi-sircular and is held in place by retaining rollers 34 rotatably mounted inside side plates 14. Retaining rollers 34 have conical inner ends 36 which ride on bevelled edges 38 on the inner curved face of yoke 30, which also centers the yoke in the mounting.

The inner gimbal member is a platform 40 mounted on a shaft 42, which is journalled in bearings 44 and 46 in opposite ends of the substantially semi-circular yoke 30, and is orthogonal to the rotational axis of the yoke. One end of shaft 42 extends through the yoke and is fitted with an actuating pulley 48. The other end of shaft 42 terminates in bearing 44. On the outside of the yoke 30 at bearing 44 is an idler pulley 50, rotatably mounted on a stud 52 which is secured in the yoke coaxial with shaft 42.

The gimbal assembly is driven by an endless belt or cable 54 which is wrapped around drive pulley 26, extends around both sides of the yoke 30 to pass around idler pulley 50 and actuating pulley 48 and is wrapped around drive pulley 28. The cable 54 is held in place at the drive pulleys 26 and 28 by retaining pulleys 56, to ensure sufficient wrap around for good frictional driving grip. Around the yoke 30 the cable is guided by suitably space support pulleys 58 to hold the cable clear of the yoke, provide free operation. An anchor clip 60 secures the cable 54 to pulley 48 for a secure drive connection. A turnbuckle or similar tightening means may be incorporated at a suitable location in the endless cable.

When both motors 18 and 20 turn in the same direction about their common axis, the yoke 30 will be rotated about its center of radius. The platform 40 will not be rotated, however, since the cable is pulled equally on both sides of the yoke. When the two motors are operated equally in opposite directions, the yoke will remain stationary and the platform 40 will be rotated with its shaft 42. By operating the motors differentially it will be obvious that various combinations of motions of the platform and yoke can be obtained. With suitable programming the platform can be made to follow any specific scanning pattern, the technique being well known.

Figure 3:
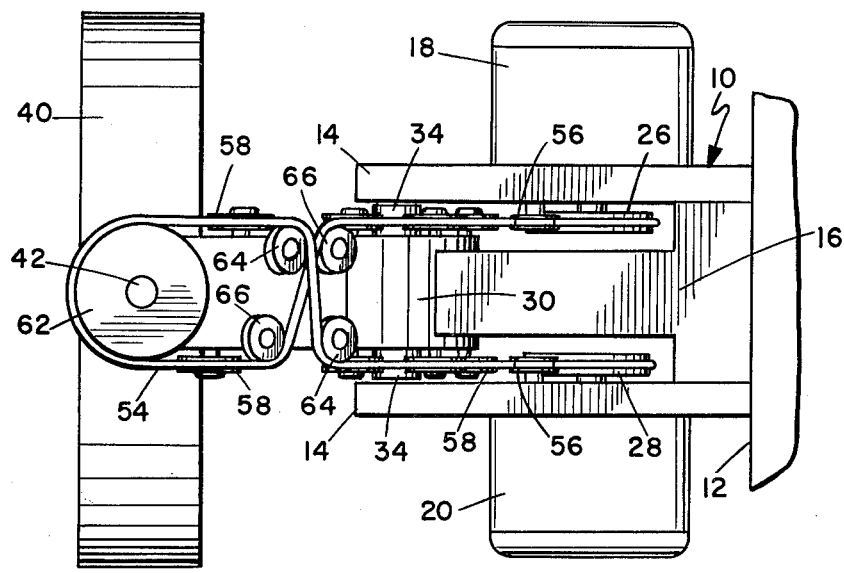
FIG. 3 is a top plan view of the gimbal mechanism with a modified drive cable arrangement.
Figure 4:
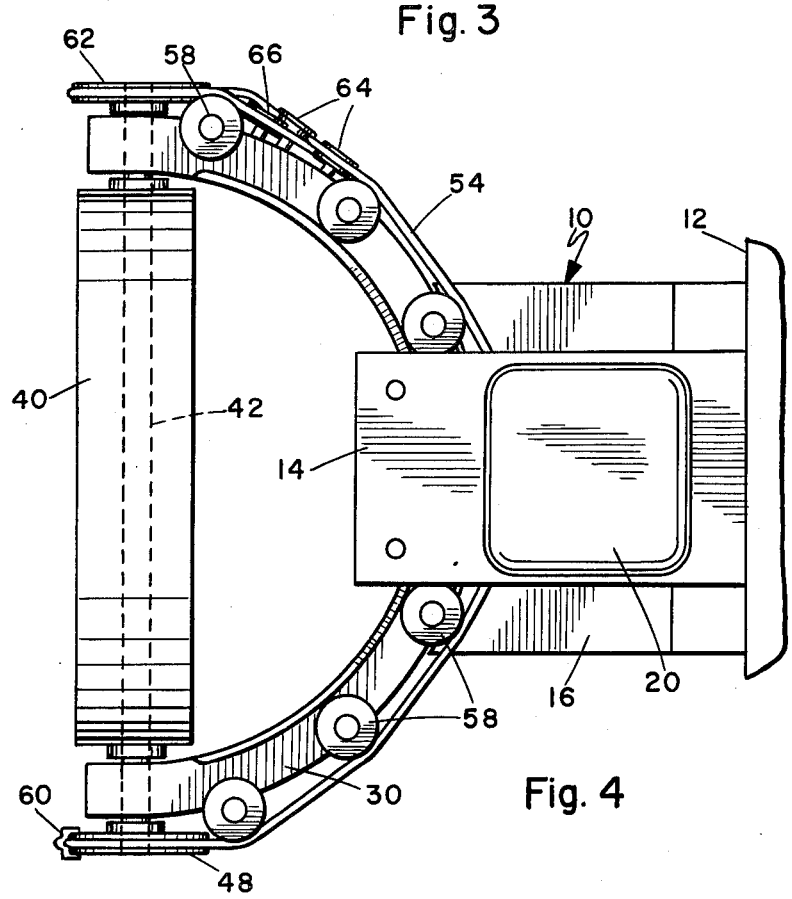
FIG. 4 is a side elevation view of the structure of FIG. 3.

The structure illustrated in FIGS. 3 and 4 is similar in most respects to that described above and corresponding parts are similarly numbered. However, the cable drive is modified to cause the platform to be driven from both ends of its supporting shaft. Instead of using the idler pulley 50, the shaft 42 projects from the yoke 30 and is fitted with a second actuating pulley 62 around which the cable 54 passes. To turn both actuating pulleys 48 and 62 in the same direction it is necessary to reverse the direction of cable motion at one end. This is accomplished by guiding the cable 54 around pairs of cross over pulleys 64 and 66 mounted on the yoke 30, as in FIG. 3. The cross over pulleys and adjacent support pulleys 58, are staggered to provide a separation between the crossed portions of the cable, in order to avoid friction.

The operation is as described above, but the platform is now driven from both ends, resulting in a more rigid drive system.

Figure 5:
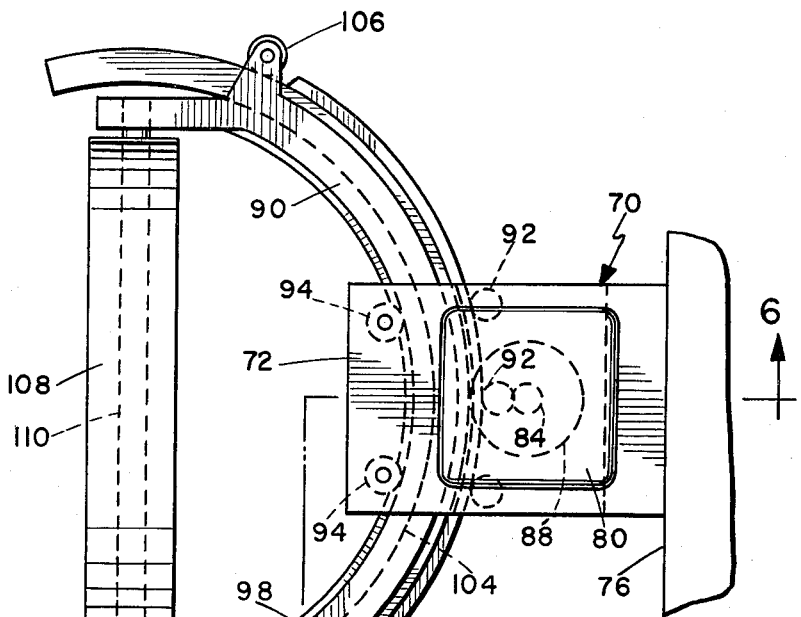
FIG. 5 is a side elevation view of an alternative drive mechanism.
Figure 6:
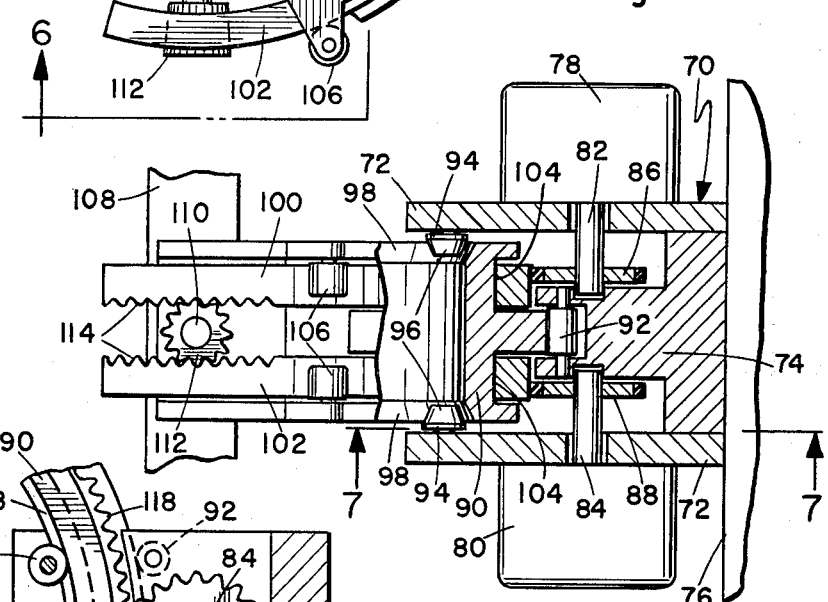
FIG. 6 is a sectional view taken on line 6—6 of FIG. 5.

In an alternative structure illustrated in FIGS. 5 and 6, the gimbal action is a geared interconnection rather than with an endless cable. A mounting 70, comprising a pair of side plates 72 and a support block 74, is secured to a support 76. Motors 78 and 80 are mounted on the side plates 72 and have shafts 82 and 84 which project inwardly and carry drive wheels 86 and 88, respectively.

A yoke 90 of arcuate configuration is mounted on support rollers 92 in block 74 and is held in place by retaining rollers 94 on the side plates 72. Retaining rollers 94 have conical ends 96 which ride on bevelled edges 98 of the yoke 90, to center the yoke in the mounting.

Side by side on the yoke 90 are ring members 100 and 102, which slide around the yoke in channels 104. The ring members are held in place by retaining rollers 106 near opposite ends of the yoke. Drive wheels 86 and 88 are in driving engagement with the ring members 100 and 102, respectively as in FIG. 6. To reduce friction the ring members could be supported on roller bearings in the channels, or a suitable lubricating or low friction surface could be applied.

A platform 108 is supported on a shaft 110, which is journalled at its end in yoke 90, the axis of the shaft being orthogonal to the axis of rotation of the yoke. At one end of the shaft is a pinion 112, the ring members 100 and 102 passing on opposite sides of the pinion and having opposed toothed racks 114, which mesh with the pinion as in FIG. 6.

Figure 7:
FIG. 7 is a sectional view as taken on line 7—7 of FIG. 6, but showing an alternative gear drive.

Instead of the frictional wheel drive, a geared drive may be used as in FIG. 7. The drive wheel would be replaced by a drive gear 116 engaging a toothed rack 118 on the ring member 102 for a positive drive connection. It should be understood that other arrangements could be used to drive the ring members, such as individual cables secured to opposite ends of the ring members and actuated by drive pulleys. The mounting of the ring members in the yoke is also merely an example, and other arrangements for supporting and retaining the ring members could be used.

Rotation of both motors 78 and 80 equally in the same direction will drive both ring members 100 and 102 equally. Through the geared connection to the platform, the yoke 90 will be caused to move with the ring members. Opposite rotation of the motors will move the ring members in opposite directions and turn pinion 112 to move the platform 108. Differential motor action will provide any required compound motion of the gimbal assembly.

The structure is particularly suitable for installation in aircraft, missiles, land vehicles, marine vessels and the like. The gimballed platform is a support which can be adapted to hold various microwave, optical, or acoustic transmitting or receiving devices which need to be aimed or scanned in a particular manner. By mounting the drive motors on the fixed support structure and simplifying the gimbal interconnecting mechanism, the moving mass is minimized. This permits fast and precise action of the gimbals with a minimum of power and a simple and compact structure.

Having described my invention, I claim:

1. A differential drive rolling arc gimbal, comprising:
   a mounting having means for attachment to a supporting structure;
   an arcuate, substantially semi-circular yoke supported in said mounting for rotation about its center of radius;
   a platform having a supporting shaft pivotally mounted in said yoke for rotation about an axis orthogonal to the axis of rotation of the yoke;
   a pair of motors on said mounting, with drive means connected to said yoke and said platform for selective independent and combined rotary motions of the yoke and platform;
   said drive means including a drive pulley on each of said motors, an actuating pulley fixed on each end of said shaft, and an endless cable extending from one drive pulley around said actuating pulleys to the other drive pulley, said endless cable being crossed over adjacent one of said actuating pulleys.

2. The structure of claim 1, and including cross over pulleys mounted on said yoke for supporting the crossed over portion of said endless cable.

3. The structure of claim 2, and including spaced support pulleys rotatably mounted on said yoke, said cable extending over said support pulleys clear of the yoke.

* * * * *